(12) United States Patent
Nemirovsky et al.

(10) Patent No.: US 8,537,172 B2
(45) Date of Patent: Sep. 17, 2013

(54) METHOD AND SYSTEM FOR PROCESSING AN IMAGE ACCORDING TO DETERMINISTIC AND STOCHASTIC FIELDS

(75) Inventors: Shira Nemirovsky, Kiryat-Tivon (IL); Moshe Porat, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 977 days.

(21) Appl. No.: 12/320,616

(22) Filed: Jan. 30, 2009

(65) Prior Publication Data
US 2010/0045692 A1   Feb. 25, 2010

Related U.S. Application Data

(60) Provisional application No. 61/091,554, filed on Aug. 25, 2008.

(51) Int. Cl.
*G09G 5/00* (2006.01)
*G09G 5/02* (2006.01)

(52) U.S. Cl.
USPC .......................... 345/582; 345/592; 345/600

(58) Field of Classification Search
USPC ................................................ 382/299, 181
See application file for complete search history.

(56) References Cited

U.S. PATENT DOCUMENTS

| 7,489,334 | B1 * | 2/2009 | Pickering et al. | 348/155 |
|---|---|---|---|---|
| 2007/0140335 | A1 * | 6/2007 | Wilinski et al. | 375/240.08 |
| 2008/0098055 | A1 * | 4/2008 | Yamaguchi et al. | 708/200 |
| 2008/0109041 | A1 * | 5/2008 | de Voir | 607/7 |

OTHER PUBLICATIONS

BS Manjunath, Tal Simchony, Rama Chellappa, Stochastic and Deterministic Networks for Texture Segmentation, IEEE Transaction on Acoustic, Speech, and Signal Processing, vol. 38, No. 6, Jun. 1990, pp. 1039-1047.*
CH Chen, LF Pau & PSP Wang, Handbook of Pattern Recognition & Computer Vision (Second Edition), 1999, p. 209.*
Chen et al. (Handbook of Pattern Recognition & Computer Vision Second Edition, 1999, p. 209) and Manjunath et al. (IEEE Transactions on Acoustics, Speech and Signal Processing, vol. 38, No. 6 Jun. 1990).*
Cross et al. "Markov Random Field Texture Models", IEEE Transactions on Pattern and Machine Intelligence, PAMI-5(1): Jan. 25-39, 1983.
Wu et al. "A Novel image interpolation Method Based on Both Local and Global Information", Advanced Intelligent Computing Theories and Applications: With Aspects of Theoretical and Methodological Issues: Third International Conference on Intelligent Computing, ICIC2007, Qingdao, China, Aug. 21-24, 2007, Lecture Notes in Computer Science, 4681: 842-851, 2007.
Chandra et al. "Texture Interpolation Using Ordinary Kriging", IbPRIA: Iberian Conference on Pattern Recognition and Image Analysis No. 2, Estoril, Portugal, Jun. 2-7, 2005, Lecture Notes in Computer Science, 3523: 183-190, 2005.

(Continued)

*Primary Examiner* — Kee M Tung
*Assistant Examiner* — Leon T Cain, II

(57) ABSTRACT

A method of assembling an image. The method comprises receiving an image depicting a pattern, identifying a stochastic field and a deterministic field of the pattern, separately increasing resolution of each the stochastic and deterministic fields, and assembling the resolution increased stochastic and deterministic fields to create an additional image of the pattern. The pattern in the additional image having a higher spatial resolution than in the image.

12 Claims, 7 Drawing Sheets

(56) References Cited

OTHER PUBLICATIONS

Francos et al. "A 2-D Autoregressive, Finite Support, Causal Model for Texture Analysis and Synthesis", 1989 International Conference on Acoustics, Speech, and Signal Processing, ICASSP-89, Glasgow, UK, May 23-26, 1989, 3: 1552-1555, May 1989.

Francos et al. "Non-Stationary Signal Processinf Using Time-Frequency Filter Banks With Applications", Signal Processing, 86: 3021-3030, 2006.

Francos et al. "On a Wold-Like Decomposition of 2-D Discrete Random Fields", 1990 International Conference on Acoustics, Speech, and Signal Processing, Albuquerque, NM, USA, Apr. 3-6, 1990, 5: 2695-2698, Apr. 1990.

Julesz "A Theory of Preattentive Texture Discrimination Based on First-Order Statistics of Textons", Biological Cybernetics, 41: 131-138, 1981.

Kuruoglu et al. "Skewed Alpha-Stable Distributions for Modelling Textures", Pattern Recognition Letters, 24(1): 339-348, Jan. 2003.

Mannos et al. "The Effects of a Visual Fidelity Criterion on the Encoding of Images", IEEE Trnasactions on Information Theory, IT-20(4): 525-536, Jul. 1974.

Maragos et al. "Two Dimensional Linear Prediction and Its Application to Adaptive Predicitive Coding of Images", IEEE Transactions on Acoustics, Speech, and Signal Processing, ASSP-32(6): 1213-1229, Dec. 1984.

Matusik et al. "Texture Design Using a Simplicial Complex of Morphable Textures", International Conference on Computer Graphics and Internactive Techniques, ACM SIGGRAPH 2005, Los Angeles, CA, USA, p. 787-794, 2005.

Nemirovsky et al. "On the Statistics of Wide-Sense Markov Random Fields and Its Application to Texture Interpolation", Internal Faculty Report, Department of Electrical Engineering, Technion—Israel Institute of Technology, Haifa, IL, p. 1-37, 2008.

Nemirovsky et al. "On Wide-Sense Markov Random Fields and Their Application to Improved Texture Interpolation", Conference Paper, Presented at Eusipco 2008 in Switzerland, p. 1-5, Aug. 2008.

Wang et al. "Generating Sub-Resolution Detail in Images and Volumes Using Constrained Texture Synthesis", IEEE Visualization, Austin, TX, USA, p. 75-82, Oct. 10-15, 2004.

Francos et al. "A Unified Texture Model Based on a 2-D Wold-Like Decomposition", IEEE Transactions on Signal Processing, 41(8): 2665-2678, Aug. 1993.

\* cited by examiner

| $f_{11}$ | $f_{12}$ | $f_{13}$ | $f_{14}$ | $f_{15}$ | $f_{16}$ |
|---|---|---|---|---|---|
| $f_{21}$ | $f_{22}$ | $f_{23}$ | $f_{24}$ | $f_{25}$ | $f_{26}$ |
| $f_{31}$ | $f_{32}$ | $f_{33}$ | $f_{34}$ | $f_{35}$ | $f_{36}$ |
| $f_{41}$ | $f_{42}$ | $f_{43}$ | $f_{44}$ | $f_{45}$ | $f_{46}$ |
| $f_{51}$ | $f_{52}$ | $f_{53}$ | $f_{54}$ | $f_{55}$ | $f_{56}$ |
| $f_{61}$ | $f_{62}$ | $f_{63}$ | $f_{64}$ | $f_{65}$ | $f_{66}$ |

FIG. 4

| $f_{11}$ | $f_{13}$ | $f_{35}$ |
|---|---|---|
| $f_{31}$ | $f_{33}$ | $f_{35}$ |
| $f_{51}$ | $f_{53}$ | $f_{55}$ |

FIG. 5

METHOD AND SYSTEM FOR PROCESSING AN IMAGE ACCORDING TO DETERMINISTIC AND STOCHASTIC FIELDS

FIELD AND BACKGROUND OF THE INVENTION

The present invention, in some embodiments thereof, relates to an image processing and, more particularly, but not exclusively, to method and system for processing stochastic and deterministic fields in an image.

One of the measurements that may be used for varying among different visual and/or graphical objects is texture. Texture may be defined as a structure that is made up of a large ensemble of elements that significantly resemble each other, organized according to some kind of 'order' in their locations. The elements are organized such that there is not a specific element that attracts the viewer's eyes, but the human viewer gets an impression of uniformity when he looks at the texture, see J. M. Francos, A. Z. Meiri and B. Porat, "A Unified Texture Model Based on a 2-D Wold-like Decomposition", IEEE Transactions on Signal Processing, Vol. 41, No. 8, August 1993 which is incorporated herein by reference.

The variety of existing textures may be classified in between two extreme categories:

Totally deterministic textures—textures of this type may be described by their primitives (or: cells) together with placement rules that define the exact location of each primitive in the texture. Examples for such a texture are a chessboard and a brick wall.

Purely stochastic textures—textures of this type are efficiently parameterized by random field analysis methods, such as Markov random fields or the auto-regressive model.

Most of the natural textures do not fall into any of the two categories mentioned above. For example, the cellular textures may have primitive cells that are not identical, although they are very similar. Furthermore, the placement rules of the primitive cells need not be totally deterministic, but the viewer will still define the texture as a cellular one. Examples for such textures are a coin collection or scattered coffee beans.

In correspondence with the above mentioned categorization of textures into 'deterministic' and 'stochastic' types, there are two main approaches to the analysis and synthesis of textures: structural and statistical.

In the structural methods, the texture is considered a cellular and ordered phenomenon. The texture is characterized accordingly by a description of its primitives and their placement rules. The placement rules may be deterministic for periodic and well-structured textures, or stochastic for more random textures, see G. C. Cross and A. K. Jain, "Markov Random Field Texture Models", IEEE Transactions on Pattern Analysis and Machine Intelligence, Vol. PAMI-5, 1983, pp. 25-39, which is incorporated herein by reference. In W. Matusik, M. Zwicker and F. Durand, "Texture Design Using a Simplicial Complex of Morphable Textures", International Conference on Computer Graphics and Interactive Techniques, SIGGRAPH 2005, pp. 784-794, which is incorporated herein by reference, Fourier analysis method is applied in order to identify the 2-D fundamental spatial frequency of the texture by locating the spectral density function maxima. This information is used to evaluate the texture placement rule and to isolate the texture primitives. The synthesis procedure places an "averaged" texture cell, according to the found placement rule. The basic disadvantage of this method is its preliminary assumption on the complete periodic structure of the texture field, which results in a synthetic look of the generated textures.

In the statistical methods, the texture is described by a collection of statistics of selected features. Many of these methods rely on the findings in Chandra, M. Petron and R. Piroddi, "Texture Interpolation Using Ordinary Kriging", Springer, 2005, which is incorporated herein by reference, according to which the human vision system uses global first and second order statistics for texture discrimination. On the basis of this work, an algorithm for synthesizing a texture field from its estimated global second-order statistics is presented in J. Wu, Q. Ruan and G. An, "A Novel Image Interpolation Method Based on Both Local and Global Information", Springer Berin, Vol. 4681, 2007, which is incorporated herein by reference. The texture is assumed to be a 2-D random field that is described by co-occurrence probabilities, the joint probability of occurrence of two gray levels, conditioned on their relative positions. The co-occurrence probabilities are estimated by the second-order sample mean. The method gives good results for homogeneous purely random texture fields, but is not suitable for more structural textures.

It is important to note that the use of spectral analysis for texture characterization is a natural choice, since the spectral content is strongly related to the spatial variation of the texture. Fine textures have a spectrum rich in high frequencies, while coarse textures are rich in low spatial frequencies.

In L. Wang and K. Mueller, "Generating Sub-Spatial resolution Detail in Images and Volumes Using Constrained Texture Synthesis", Proceeding of IEEE Conference on Visualization, October 2004, pp. 75-82, which is incorporated herein by reference, the use of a 2-D, auto-regressive, non-causal model for synthesizing textures is suggested. This model characterizes the gray level of a pixel as a linear combination of the gray levels at neighboring pixels and an additive noise.

SUMMARY OF THE INVENTION

According to some embodiments of the present invention there is provided a method of increasing a resolution of a pattern. The method comprises receiving an image depicting a pattern, identifying a stochastic field and a deterministic field of the pattern, separately increasing resolution of each the stochastic and deterministic fields, and assembling the resolution increased stochastic and deterministic fields to create an additional image of the pattern. The pattern in the additional image having a higher spatial resolution than in the image.

Optionally, the increasing comprises interpolating the stochastic field according to an autoregressive (AR) model.

More optionally, the increasing comprises detecting an invariance of a gray level distribution in the stochastic field, the AR model being based on the invariance.

More optionally, the identifying estimating a plurality of AR model parameters for reducing error variance and the interpolating comprises using the AR model parameters.

More optionally, the autoregressive model is a wide-sense Markov field model.

Optionally, the increasing comprises estimating a white noise distribution in the pattern and interpolating the stochastic field according to the white noise distribution.

Optionally, the increasing comprises zero padding the deterministic field according to an autoregressive (AR) model.

Optionally, the increasing detecting periodic features in the pattern and increasing the resolution of the deterministic field accordingly.

Optionally, the pattern is a textural pattern.

Optionally, the receiving further comprises segmenting the pattern from the image.

More optionally, the image comprises a plurality of patterns, further comprises performing the a)-d) in a plurality of iterations, each the pattern being segmented and separately processed according to the a)-d) in each the iteration.

According to some embodiments of the present invention there is provided a computer program product that comprises a computer usable medium having a computer readable program code embodied therein, the computer readable program code adapted to be executed to implement a method for method of increasing a resolution of a pattern. The method comprises receiving an image depicting a pattern, identifying a stochastic field and a deterministic field of the pattern, separately increasing resolution of each the stochastic and deterministic fields, and assembling the resolution increased stochastic and deterministic fields to create an additional image of the pattern. The pattern in the additional image having a higher spatial resolution than in the image.

According to some embodiments of the present invention there is provided a method for estimating similarity of textural patterns. The method comprises providing first stochastic and deterministic fields of a first textural pattern, providing second stochastic and deterministic fields of a second textural pattern, separately scoring a first match between the first and second stochastic fields and a second match between the first and second deterministic fields, and outputting a similarity score by combining the first and second matches.

Optionally, the first match is performed according a correlation between autocorrelation matrices of the first and second stochastic fields.

Optionally, the second match is performed by calculating a fidelity criterion based on radial frequency of the first and second deterministic fields.

Optionally, the first textural pattern is of a manufactured product and the second textural pattern is a model of a required pattern for the manufactured product, further comprises categorizing the manufactured product according to the similarity score.

Optionally, the first textural pattern is of an image provided as a search query and the second textural pattern is of a network available image, further comprises retrieving the second textural pattern if the similarity score being indicative of similarity above a predefined threshold.

Optionally, the similarity score is converted to a reveal value decrypted in the textural pattern.

According to some embodiments of the present invention there is provided a system for estimating image similarity. The system comprises an input unit configured for receiving an image depicting a textural pattern, a decomposition unit configured for decomposing a received stochastic and deterministic fields from the received textural pattern, a memory configured for storing at least one stored textural pattern having stochastic and deterministic fields, a matching module configured for separately scoring a first match between the received and stored stochastic fields and a second match between the received and stored deterministic fields, and an output module configured for outputting a similarity score by using the first and second matches.

Optionally, each the at least one stored textural pattern is prepossessed for extracting respective the stochastic and deterministic fields, the memory being configured for storing the extracted stochastic and deterministic fields.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volitile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 4 and 5 are schematic illustrations that demonstrate the relation between images of a pattern with different resolutions;

DESCRIPTION OF EMBODIMENTS OF THE INVENTION

Figure 1:
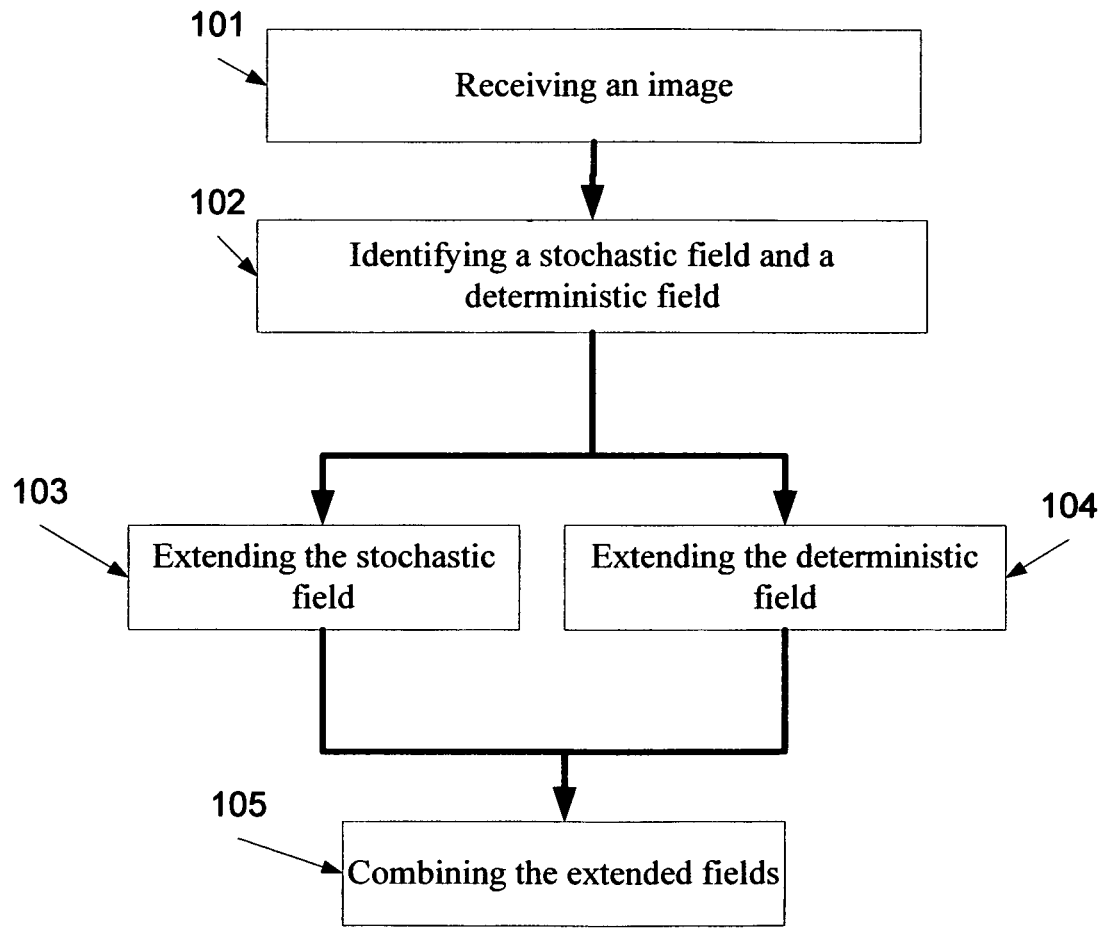
FIG. 1 is a flowchart of a method of assembling an image with an increased spatial resolution by processing stochastic and deterministic fields of an original image with lower spatial resolution, according to some embodiments of the present invention.

The present invention, in some embodiments thereof relates to an image processing and, more particularly, but not exclusively, to method and system for processing stochastic and deterministic fields in an image.

According to some embodiments of the present invention there is provided a method and a system of increasing the resolution of a pattern, such as a textural pattern, based on the identification and separate processing of stochastic and deterministic fields that compose the pattern. Optionally, the stochastic and deterministic fields are decomposed according to an orthogonal decomposition texture model. Optionally, the stochastic is interpolated according to an invariance of the gray level distribution of the stochastic field of the pattern. The invariance is used in a model for generating a high resolution stochastic field. Optionally, the deterministic field is interpolated according to periodic features which are detected in the received pattern. The method may be used for increasing the resolution of images, image segments, images of video segments and the like.

According to some embodiments of the present invention there is provided a method and a system for assessing the similarity between images by determining the similarity between stochastic and deterministic fields thereof. Optionally, the method and system are based on a decomposition of an image texture into its deterministic and stochastic fields. The similarity between deterministic fields is estimated according to a Mannos and Sakrison criterion. The similarity between stochastic fields component may be assessed according to a correlation match property.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a flowchart of a method of assembling an image with an increased spatial resolution by processing stochastic and deterministic fields of an original image with lower spatial resolution, according to some embodiments of the present invention.

First, as shown at 101, an image depicting one or more patterns is received. As used herein an image means a bitmap, a sequence of vector graphic primitives, a compressed image, such as joint photographic experts group (JPEG) image, and an image taken from a sequence of images, such as a video file. Optionally, the image is a textural image that depicts a textural pattern. As used, herein a textural image segment, a textural image, texture field and/or a texture means an image comprising a plurality of repeating continuous separable element, such as texels, a region descriptor of the variation of image components and the arrangement thereof in a surface, quantifying properties such as smoothness, coarseness and regularity above, and/or a structure which is made up of a large ensemble of image elements that significantly resemble each other, organized in an separable order in their locations. The elements are organized such that there is not a specific image element that attracts a viewer's eyes, providing a human viewer with an impression of uniformity when looking at the texture, see J. M. Francos, A. Z. Meiri and B. Porat, "A Unified Texture Model Based on a 2-D Wold-like Decomposition", IEEE Transactions on Signal Processing, Vol. 41, No. 8, August 1993, which is incorporated herein by reference. An image texture may be specified as a grayscale or a color image of a natural textured surface and/or a simulated pattern that approaches the natural image. It should be noted that though most of the description below is on a grayscale image, it also pertains to color images. As each color image may be converted to one or more grayscale images, using the methods and systems below for processing image color is straight forward.

Now, as shown at 102, an in-deterministic field, which may be referred to herein as a stochastic field, and a deterministic field, which may be referred to herein as a deterministic field of the received image, are identified and/or decomposed.

For example, if the image is a homogeneous 2-D texture field, denoted herein as $\{y(m,n)\}$, an orthogonal decomposition is performed as follows:

$$y(m,n)=w(m,n)-v(m,n),$$

where $w(m,n)$ is the purely in-deterministic field and $v(m,n)$ is a deterministic field.

The deterministic field $v(m,n)$ may be further decomposed as $$v(m,n)=h(m,n)+g(m,n), \qquad \text{Eq. 1}$$

where $h(m,n)$ denotes a deterministic field, which may be referred to herein as a harmonic field, and $g(m,n)$ denotes a generalized evanescent field. Generally speaking, the harmonic field generates the periodic features of the texture field, while the evanescent component generates global directional features in the texture field. The spectral density function of the harmonic field is a sum of 2-D delta functions, while the spectral density function of the generalized evanescent field is a sum of 1-D delta functions that are supported on lines of rational slope in the frequency domain; see J. M. Francos, A. Z. Meiri and B. Porat, "A Unified Texture Model Based on a 2-D Wold-like Decomposition", IEEE Transactions on Signal Processing, Vol. 41, No. 8, August 1993, J. M. Francos and A. Z. Meiri, "A 2-D Autoregressive, Finite Support, Causal Model for Texture Analysis and Synthesist", 1989 International Conference on Acoustics, Speech and Signal Processing, and J. M. Francos, A. Z. Meiri and B. Porat, "On a Wold-Like Decomposition of 2-D Discrete Random Fields", 1990 International Conference on Acoustics, Speech and Signal Processing, which are incorporated herein by reference.

Optionally, the generalized evanescent field is ignored and therefore $g(m,n)=0$. In such a manner, the deterministic component $v(m,n)$ is composed of only the harmonic field and therefore $v(m,n)=h(m,n)$. It should be noted that by ignoring the generalized evanescent field, the emphasis is on images of textures that possess periodic features and not directional ones, see A. Francos and M. Porat, "Non-Stationary Signal Processing Using Time-Frequency Filter Banks with Applications", Elsevier Signal Processing, Volume 86, 2006, pp. 3021-3030, which is incorporated herein by reference.

For clarity, the harmonic field h(m,n) may be expressed as a countable sum of weighted 2-D sinusoids, for example as follows:

$$h(m, n) = \sum_{k=1}^{P} \{C_k \cos 2\pi(n\omega_k + mv_k) + D_k \sin 2\pi(n\omega_k + mv_k)\}, \quad \text{Eq. 2}$$

where $(\omega_k, v_k)$ are the spatial frequencies of the $k^{th}$ harmonic. Optionally, $C_k$'s and $D_k$'s are constant parameters.

Figure 2:
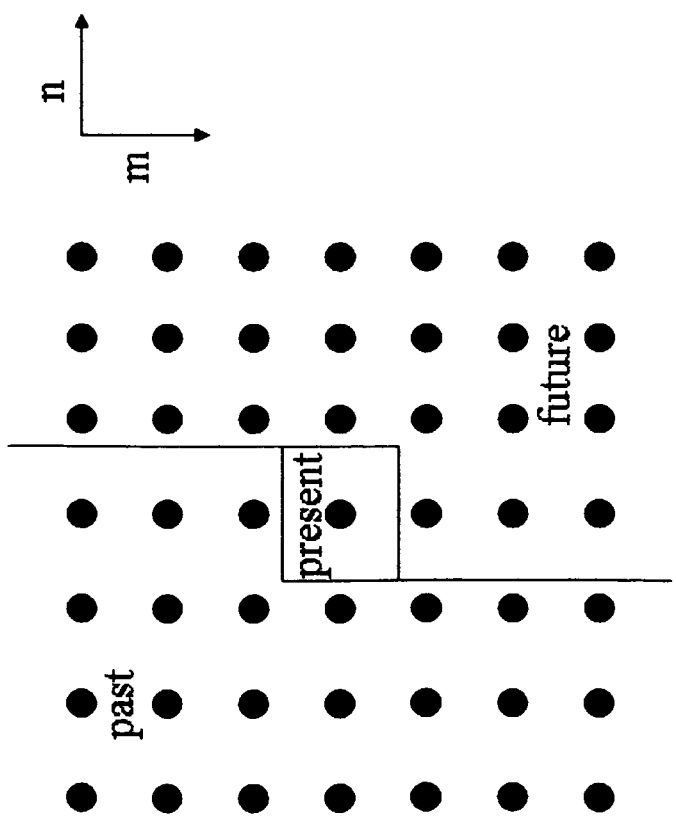
FIG. 2 is a schematic illustration of a two-dimensional support for the auto-regressive model.

As described above, the aforementioned decomposition of the homogeneous 2-D texture field generates w(m,n), which is the purely in-deterministic field. This component may be expressed according to a two dimensional (2-D) auto-regressive (AR) model, for example as follows:

$$w(m, n) = -\sum_{(k,l) \in X_{m,n}} a(k, l) w(m-k, n-l) + u(m, n), \quad \text{Eq. 3}$$

where u(m,n) denotes a 2-D white noise field and {a(k,l)} denotes the parameters of the auto-regressive model. In such an expression, the field may be represented as $X_{m,n}$, which is defined as follows:

$$X_{m,n} = \{(k,l) | l=n, k<m\} \cup \{(k,l) | l<n, \text{all } k\}. \quad \text{Eq. 4}$$

where $X_{m,n}$ is derived in relation to the $X_{m,n}$ in a wide-Sense Markov Random Fields, which is described below. For clarity, reference is now made to FIG. 2, which is a schematic illustration of a two-dimensional support for the auto-regressive model. In FIG. 2, the pixel at location (m,n) is referred to as the "present", while the pixels that belong to $X_{m,n}$ are referred to as the "past", and the remaining pixels as the "future". These terms allow defining a 2-D ordering relation that is an extension to the one dimensional (1-D) natural time ordering in a simple 1-D auto-regressive model. Since the purely in-deterministic field w(m,n) in Eq. 3 is auto-regressive with relation to its "past" samples, it may be viewed as generated by a causal auto-regressive model.

In order to estimate the 2-D AR model parameters {a(k,l)}, according to the formulation in Eq. 3, a set of parameters that minimizes the variance of the white noise, which is also the prediction error variance, is calculated. Applying the orthogonality principle for optimal linear estimation, the following set of normal equations is obtained:

$$r(i, j) + \sum_{(k,l) \in X_{(i,j)}} a(k, l) r(i-k, j-l) = \begin{cases} \sigma^2, & \text{for } (i, j) = (0, 0) \\ 0, & \text{else} \end{cases} \quad \text{Eq. 5}$$

where {r(i,j)} is an autocorrelation sequence of the field w(m,n), and $\sigma^2$ is the variance of a white noise or the prediction error variance. Optionally, the white noise is a zero-mean white noise with variance that is assumed to be uncorrelated with the received image.

Now, as shown at 103 and 104, the spatial resolution of each one of the stochastic and deterministic fields is increased, for example by interpolation.

Reference is now made to exemplary operations for increasing spatial resolution of the stochastic field 103. Optionally, the stochastic field is interpolated according to an autoregressive image model, such as wide-sense Markov random fields, see R. Chellapa and A. Jain, "Markov Random Fields—Theory and Application", Academic Press, 1991, P. A. Maragos, R. W. Schafer and R. M. Mersereau, "Two-Dimensional Linear Prediction and Its Application to Adaptive Predictive Coding of Images", IEEE Transactions on Acoustics, Speech and Signal Processing, Vol. 32, December 1984, pp. 1213-1229, and A. Rosenfeld and A. C. Kak, "Digital Picture Processing", Academic Press, second edition, Vol. 1, 1982, which are incorporated herein by reference.

In this document, it is assumed that the first-order wide-sense Markov model is invariant under a sampling operation, for example in a manner that a wide-sense Markov image retains its model under the sampling operation and that an image gray scale distribution, such as a histogram is invariant under the sampling operation.

Figure 3:
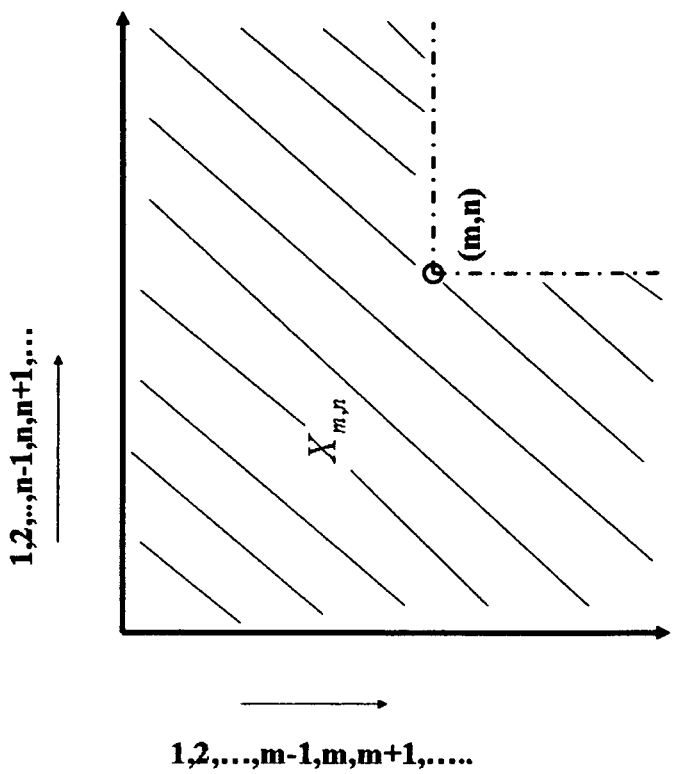
FIG. 3 is a schematic illustration of an L-shaped region formed by the dashed lines of illustrating matrix indexing.

For clarity, $X_{m,n}$ is defined as suggested in A. Rosenfeld and A. C. Kak, "Digital Picture Processing", Academic Press, second edition, Vol. 1, 1982, which is incorporated herein by reference, where $X_{m,n}$ denotes all the pixels that belong to an L-shaped region of an image matrix as shown in FIG. 3, wherein an L-shaped region formed by the dashed lines is $X_{m,n}$. It should be noted that the pixel at the location (m,n) is not included in $X_{m,n}$.

In addition, M×N denotes an array of points and f(m,n) denotes a discrete random field thereon. As the gray level f(i,j) at all points within $X_{m,n}$ is known from the values of the stochastic field, the gray level at (m,n) may be estimated under the constraint that this estimate would be a linear function of the gray levels in $X_{m,n}$. Briefly stated, $\hat{f}(m,n)$ denotes the optimal estimator for f(m,n) based on the gray levels at $X_{m,n}$, and may be represented or calculated as follows:

$$\hat{f}(m, n) = \sum_{\substack{i,j \\ s.t. \\ (m-i, n-j) \in X_{m,n}}} c_{i,j} f(m-i, n-j), \quad \text{Eq. 6}$$

where the coefficients $c_{ij}$ are chosen such that the mean-square estimation error $$e_{m,n} = E\{[f(m,n) - \hat{f}(m,n)]^2\} \quad \text{Eq. 7}$$

is minimized. For clarity, $\hat{f}(m,n)$ may be referred to herein as the linear least square estimation of f(m,n). In such a case, where the least square estimation of f(m,n) in terms of $X_{m,n}$ may be expressed as a linear combination, as in Eq. 6, the field f denotes a wide-sense Markov field.

Optionally, the wide-sense Markov field is of first order. For brevity, unless stated otherwise, the term wide-sense Markov will refer to first-order wide-sense Markov.

Optionally, as used herein, a first-order wide-sense Markov is a random field with coefficients $c_{i,j}$ in Eq. 6 which are defined so that the linear least square estimation of f(m,n) may be constructed as follows:

$$\hat{f}(m, n) = \sum_{(i,j) \in D} c_{i,j} f(m-i, n-j). \quad \text{Eq. 8}$$

where D denotes the following pairs of (i,j):

$$D = \{(0,1), (1,1), (1,0)\}. \quad \text{Eq. 9}$$

In such a manner, the least squares estimate of f(m,n) in terms of $X_{m,n}$ is the same as the estimate in terms of the three nearest neighbors on the left and above corner The normal equations for the wide-sense Markov random field Eq. 8 are:

$$c_{1,0} R_f(0,0) + c_{1,1} R_f(0,1) + c_{0,1} R_f(-1,1) = R_f(-1,0) \quad \text{Eq. 10a}$$

$$c_{1,0} R_f(0,1) + c_{1,1} R_f(0,0) + c_{0,1} R_f(-1,0) = R_f(-1,1) \quad \text{Eq. 10b}$$

$$c_{1,0}R_{ff}(1,-1)+c_{1,1}R_{ff}(1,0)+c_{0,1}R_{ff}(0,0)=R_{ff}(0,-1) \quad \text{Eq. 10c}$$

where $$R_{ff}(\alpha,\beta)=E\{f(m,n)f(m-\alpha,n+\beta)\} \quad \text{Eq. 11}$$

is the autocorrelation matrix of the random field f(m,n), and where the expectation value E{•} is taken over all the pairs f(m,n),f(m+α,n+β). The normal equations 10a-10c may be solved for the coefficients $c_{1,0}, c_{0,1}, c_{1,1}$.

Thus, the wide-sense Markov random field Eq. 8 may be calculated by the following difference equation:

$$f(m,n) - \sum_{(i,j)\in D} c_{i,j} f(m-i, n-j) = \xi(m,n), \quad \text{Eq. 12}$$

where $\xi(m,n) \equiv f(m,n) - \hat{f}(m,n)$ is the difference at each point.

For clarity, the difference ξ(m,n) may be characterized by the following Theorem, referred to herein as Theorem A: A discrete random field f(m,n) is wide-sense Markov if and only if it satisfies the difference equation Eq. 12 for all points (m,n) with m>1 and n>1 (where the $c_{i,j}$'s are the solutions of Eqs. 10a-10c), and in addition the following equations for the points on the topmost row and the leftmost columns:

$$f(1,1)=\xi(1,1) \quad \text{Eq. 13a}$$

$$f(m,1)-Af(m-1,1)=\xi(m,1), m>1 \quad \text{Eq. 13b}$$

$$f(1,n)-Bf(1,n-1)=\xi(1,n), n>1, \quad \text{Eq. 13c}$$

where $$A=R_{ff}(1,0)/R_{ff}(0,0), \quad \text{Eq. 14}$$

$$B=R_{ff}(0,1)/R_{ff}(0,0),$$

and where ξ(m,n) is a discrete random field of orthogonal random variables, for example:

$$E\{\xi(m,n)\xi(p,q)\}=0, m\neq p \text{ or}$$

$$n\neq q. \quad \text{Eq. 15}$$

where the autocorrelation function of the a wide-sense Markov field is $$R_{ff}(\alpha,\beta)=C \cdot \exp(-c_1|\alpha|-c_2|\beta|) \quad \text{Eq. 16}$$

where C is a constant parameter.

Optionally, the autocorrelation function $R_{ff}(0,0)=1$. In order to allow $R_{ff}(0,0)=1$, the received image is normalized by dividing it by $\sqrt{R_{ff}(0,0)}$. The normalization allows avoiding the need to insert a multiplicative constant to $R_{ff}(\alpha,\beta)$. In such an embodiment, the expression in Eq. 16 may be rewritten as $$R_{ff}(\alpha,\beta)=\rho_h^{|\alpha|}\rho_v^{|\beta|}$$

where $\rho_h=e^{-c_1}$ and $\rho_v=e^{-c_2}$ are measures of the horizontal and vertical correlation, respectively. Substituting Eq. 16 in Eqs. 10a-10c, the following solution is obtained:

$$c_{1,0}=\rho_h, c_{0,1}=\rho_v, c_{1,1}=-\rho_h\rho_v \quad \text{Eq. 18}$$

Hence, the autocorrelation in Eq. 17 may be rewritten as $$R_{ff}(\alpha,\beta)=c_{10}^{|\alpha|}c_{01}^{|\beta|} \quad \text{Eq. 19}$$

Then, by inserting Eq. 17 into Eq. 14 the following is obtained:

$$A=c_{10}, B=c_{01} \quad \text{Eq. 20}$$

It should be noted that the autocorrelation in Eq. 16 has a double Laplacian form, which is a multiple of two Laplacians, in the vertical and horizontal directions α,β, respectively. In other words, the autocorrelation in Eq. 16 has a separable form in the vertical and horizontal directions. This double Laplacian and separable form is later applied to prove the invariance of the wide-sense Markov model under sampling, see Theorem A, and also (A.13), (A.14) in Appendix A of Shira Nemirovsky el. Al., On Texture and Image Interpolation using Markov Models, Signal Processing: Image Communication Elsevier B. V, In Press, Corrected Proof, Available online 21 Nov. 2008, which is incorporated herein by reference, and is thus necessary for the subsequent texture interpolation analysis.

Optionally, the autocorrelation functions, resulting from the first-order wide-sense Markov, comply with the normal equations Eqs. 10a-10c. In such an embodiment, the autocorrelation may not be separable and therefore the solution of Eq. 18 may not hold. Such normal equations Eqs. 10a-10c may be solved for the coefficients $\{c_{10}, c_{01}, c_{11}\}$.

As described above, the spatial resolution of the stochastic field is increased using an interpolation which is based on wide-sense random Markov model. In such an embodiment, the stochastic field is represented and processed as a wide-sense Markov random field.

In the following section the relation between the stochastic field of the resolution increased image and the original stochastic field of the received image is clarified by defining a sampling operation between the increased spatial resolution stochastic field and the original stochastic field.

Sampling

In this section we introduce the aforementioned sampling operation. For brevity, we define the original stochastic field as f* a square image whose dimensions are M×M and the increased spatial resolution stochastic field as a square image, whose dimensions are (2M)×(2M). We denote the interpolated image by f.

Sampling f every other pixel yields a low-spatial resolution version of this image, which we denote by f*. Specifically, if k,l are the row and column indices of f* respectively, then $$f^*(k,l)=f(2k-1,2l-1). \quad \text{Eq. 21}$$

As, the dimensions of f* is M×M, the dimensions of f consists of $3M^2$ more pixels. FIGS. 4 and 5 demonstrate the relation between f,f*.

By examining statistical properties of f and f*, which are represented as Markov random field images, given that the autocorrelation of the high spatial resolution image is as in Eq. 16 and Eq. 19, for example, has an exponential form. For brevity, general indices i,j, are avoided and instead numerical indices are used as the ones that appear in FIGS. 4 and 5. This indexing convention is valid due to the global nature of the definition of a wide-sense Markov field (see Eq. 12), or the fact that the coefficients $c_{01}, c_{10}, c_{11}$ are constant and that the white noise ξ is assumed to have the same variance throughout the whole image.

For clarity, Theorem A is defined. f denotes a wide-sense Markov random field with an autocorrelation of the form:

$$R_{ff}(\alpha,\beta)=\rho_h^{|\alpha|}\rho_v^{|\beta|},$$

where $$c_{1,0}=\rho_h, c_{0,1}=\rho_v, c_{1,1}=-\rho_h\rho_v.$$

Then, the sampled version f* is also wide-sense Markov and its coefficients are given by $$c^*_{10}=c_{10}^2, c^*_{01}=c_{01}^2, c^*_{11}=-c^*_{01}c^*_{10}. \quad \text{Eq. 22}$$

More details are provided in Appendix A of Shira Nemirovsky el. Al., On Texture and Image Interpolation using Markov Models, Signal Processing: Image Communication Elsevier B. V, In Press, Corrected Proof, and available online 21 Nov. 2008, which is incorporated herein by reference.

Using Theorem A, it is possible to derive relations between the statistics of the images, and also between their generating white noise statistics.

Specifically, the first relation (or corollary) states that $$\sigma_{\xi^*}^2 = (c_{01}^2 c_{10}^2 + c_{01}^2 + c_{10}^2 + 1)\sigma_\xi^2. \quad \text{Eq. 23}$$

where f denotes a wide-sense Markov random field and f* denotes its sampled version, $\sigma_\xi^2, \sigma_{\xi^*}^2$, denotes the variances of the generating white noise of f,f* respectively, and $\xi$ denotes a white noise, for example where $\xi(m_1,n_1), \xi(m_2,n_2)$ are statistically independent for $m_1 \neq m_2$ or $n_1 \neq n_2$.

A above corollary may be shown by using a variance of the sum of two independent random variables, for example as described in equation A.15 of Appendix A of Shira Nemirovsky el. Al., On Texture and Image Interpolation using Markov Models, Signal Processing: Image Communication Elsevier B. V, In Press, Corrected Proof, Available online 21 Nov. 2008, which is incorporated herein by reference:

$$\sigma_{\xi^*}^2 = (c_{01}c_{10})^2 \sigma_\xi^2 + c_{01}^2 \sigma_\xi^2 + c_{10}^2 \sigma_\xi^2 + \sigma_\xi^2. \quad \text{Eq. 24}$$

where a simple rearranging of Eq. 24 yields Eq. 23.

A second corollary may be shown by f that denotes a wide-sense Markov image with an exponential autocorrelation $R_{f\!f}(\alpha,\beta) = c_{10}^{|\alpha|} c_{01}^{|\beta|}$, for example as described above in relation to Eq. 19. Then, the autocorrelation of f* that denotes a sampled image is given by sampling the autocorrelation of f, for example as follows:

$$R^*_{f\!f}(\alpha,\beta) = R_{f\!f}(2\alpha, 2\beta). \quad \text{Eq. 25}$$

This may be shown by the relation between the coefficients of f and f* which is shown at Eq. 22. This may be obtained by Eq. 19 as follows:

$$R^*_{f\!f}(\alpha,\beta) = (c^*_{10})^{|\alpha|}(c^*_{01})^{|\beta|} = (c_{10}^2)^{|\alpha|}(c_{01}^2)^{|\beta|} = (c_{10})^{2|\alpha|} (c_{01})^{2|\beta|} = R_{f\!f}(2\alpha, 2\beta), \quad \text{Eq. 26}$$

According to this result, the autocorrelation of f* is obtained by sampling the autocorrelation of f. If the autocorrelation is calculated in an empirical manner, i.e. as the average of multiples of pixels with lags, such as, $$\hat{R}_{f\!f}(\alpha, \beta) @ \quad \text{Eq. 27}$$

$$\begin{cases} \dfrac{1}{(M-|\alpha|)(N-|\beta|)} \displaystyle\sum_{m=0}^{M-|\alpha|-1} \sum_{n=0}^{N-|\beta|-1} f(m,n)f(m+|\alpha|, n+|\beta|), & \text{sign}(\alpha \cdot \beta) > 0 \\ \dfrac{1}{(M-|\alpha|)(N-|\beta|)} \displaystyle\sum_{m=0}^{M-|\alpha|-1} \sum_{n=|\beta|+1}^{N} f(m,n)f(m+|\alpha|, n-|\beta|), & \text{else.} \end{cases}$$

$M, N$ = image size then Eq. 25 holds for any arbitrary distribution. However, it should be noted that the second corollary does not relate to the empirical autocorrelation, but rather to an actual autocorrelation, or a statistical one. In other words, the second corollary refers to an autocorrelation that corresponds to the true statistical distribution of the image field. It should be noted that in the aforementioned Theorem A, the relation between the coefficients of the wide-sense Markov images was obtained without relying on an ergodicity assumption, according to which a true autocorrelation that is approximated by an empirical autocorrelation.

As the validity of the second corollary relies on the results of Theorem A, then Eq. 25 holds for the true Laplacian distribution Eq. 16. As described above, the invariance of a second-order wide-sense Model under the sampling operation is obtained for such a distribution.

In the light of the above, the second corollary may be extended to an arbitrarily distributed image if the true autocorrelation is approximated by an empirical autocorrelation. If in addition the following is defined:

$$f^*(m,n) = f(2m-1, 2n-1) \quad \text{Eq. 28}$$

then the following holds:

$$\begin{aligned} R^*_{f\!f}(\alpha, \beta) &\approx \hat{R}^*_{f\!f}(\alpha, \beta) \\ &= \sum_{m,n} \{f^*(m,n) f^*(m+\alpha, n+\beta)\} \\ &= \sum_{m,n} \{f(2m-1, 2n-1) f(2(m+\alpha)-1, 2(n+\beta)-1)\} \\ &= \hat{R}_{f\!f}(2\alpha, 2\beta) \\ &\approx R_{f\!f}(2\alpha, 2\beta) \end{aligned} \quad \text{Eq. 29}$$

where hat ($\hat{\cdot}$) operator denotes an empirical autocorrelation. Eq. 29 yields $R^*_{f\!f}(\alpha,\beta) \approx R_{f\!f}(\alpha,\beta)$, where in Eq. 29 the expression in Eq. 27 is inserted, ignoring the normalization constant, which is usually set to 1.

A third corollary may be defined where the second-order moments of f,f* are, for example, defined as follows:

$$Ef^2 = E(f^*)^2 \quad \text{Eq. 30}$$

The validly of the third corollary may be shown as follows:

$$Ef^2 = R_{f\!f}(0,0).$$

where $\alpha = \beta = 0$ are substituting in Eq. 26 to obtain $$E(f^*)^2 = R^*_{f\!f}(0,0) = R_{f\!f}(0,0) = Ef^2,$$

which is the desired result.

Optionally, if the white noise $\{\xi_{mn}\}$ is normally distributed, a moment, such as a gray level probability distribution, of f* up to any order is equal to a respective moment of f. The equilibrium, referred to herein as theorem B, may be shown by an example in which the gray level of f is normally distributed. In such a field, each pixel in f may be expressed as a linear combination of samples of the normally distributed white noise $\xi$. For example, $$f_{11} = \xi_{11}$$

$$f_{22} = c_{10} f_{12} + c_{01} f_{21} + c_{11} f_{11} + \xi_{22} =$$

$$= c_{10}[c_{01} f_{11} + \xi_{12}] + c_{01}[c_{10} f_{11} + \xi_{21}] + c_{11} f_{11} + \xi_{22} =$$

-continued $$= 2c_{10}c_{01}f_{11} - c_{10}c_{01}f_{11} + c_{10}\xi_{12} + c_{01}\xi_{21} + \xi_{22} =$$
$$= c_{10}c_{01}\xi_{11} + c_{10}\xi_{12} + c_{01}\xi_{21} + \xi_{22}.$$

since $\xi$ is a normally distributed white noise, the last result implies that each pixel in f is a linear combination of statistically independent normally distributed random variables, and thus is also a normally distributed random variable, see A. Papoulis, "Probability, Random Variables, and Stochastic Processes", Second Edition, McGraw-Hill, 1985, which is incorporated herein by reference. Furthermore, using the result of Theorem A and applying the same arguments for the low-spatial resolution image f*, one may obtain that it is also normally distributed.

As described above, the variances of the low and high spatial resolutions are equal according to the third corollary. Thus, assuming that the expectation value of the noise is zero, f and f* have zero mean and the first two moments of f,f* are equal. Since f and f* are normally distributed and have equal first and second moments, their gray level distributions are also equal as stated by Theorem B, see A. Papoulis, "Probability, Random Variables, and Stochastic Processes", Second Edition, McGraw-Hill, 1985, which is incorporated herein by reference.

It should be noted that Theorem B relies on the assumption that the white noise which generates the wide-sense Markov field is normally distributed, and hence, due to its invariance under linear transform, it is obtained that each pixel in the field is also normally distributed, for example as elements are distributed in a textural field. In addition, the residuals of regression equations, such as the above mentioned $\xi_{22}$, may be, in general, non-Gaussian. For example, in E. E. Kuruoglu and J. Zerubia, "Skewed Alpha-Stable Distributions for Modelling Textures", Pattern Recognition Letters, Volume 24, Number 1, January 2003, pp. 339-348(10) which is incorporated herein by reference, the alpha-stable distribution family is proposed as a texture model. This distribution is a generalization of the Gaussian distribution, and is shown to be capable of representing both impulsive and un-symmetric image data which cannot be obtained by the Gaussian model.

Furthermore, it should be noted that linear combinations of independent alpha-stable random variables are also alpha-stable, see E. E. Kuruoglu and J. Zerubia, "Skewed Alpha-Stable Distributions for Modelling Textures", which is incorporated herein by reference. Thus, Theorem B may be extended to the case of wide-sense Markov fields in which a white noise is alpha-stable distributed.

Reference is now made to the increasing of the spatial resolution of the deterministic field 104. Optionally, spatial resolution increase is performed by interpolating the deterministic field 104 by zero padding in the frequency domain.

Now, as shown at 105, the resolution increased deterministic and stochastic fields may be used for reconstructing an additional image of the pattern in the received image with a higher spatial resolution. Optionally, the deterministic and stochastic fields are combined by a matrix addition operation which is normalized according to the relative contribution of each field.

Figure 6:
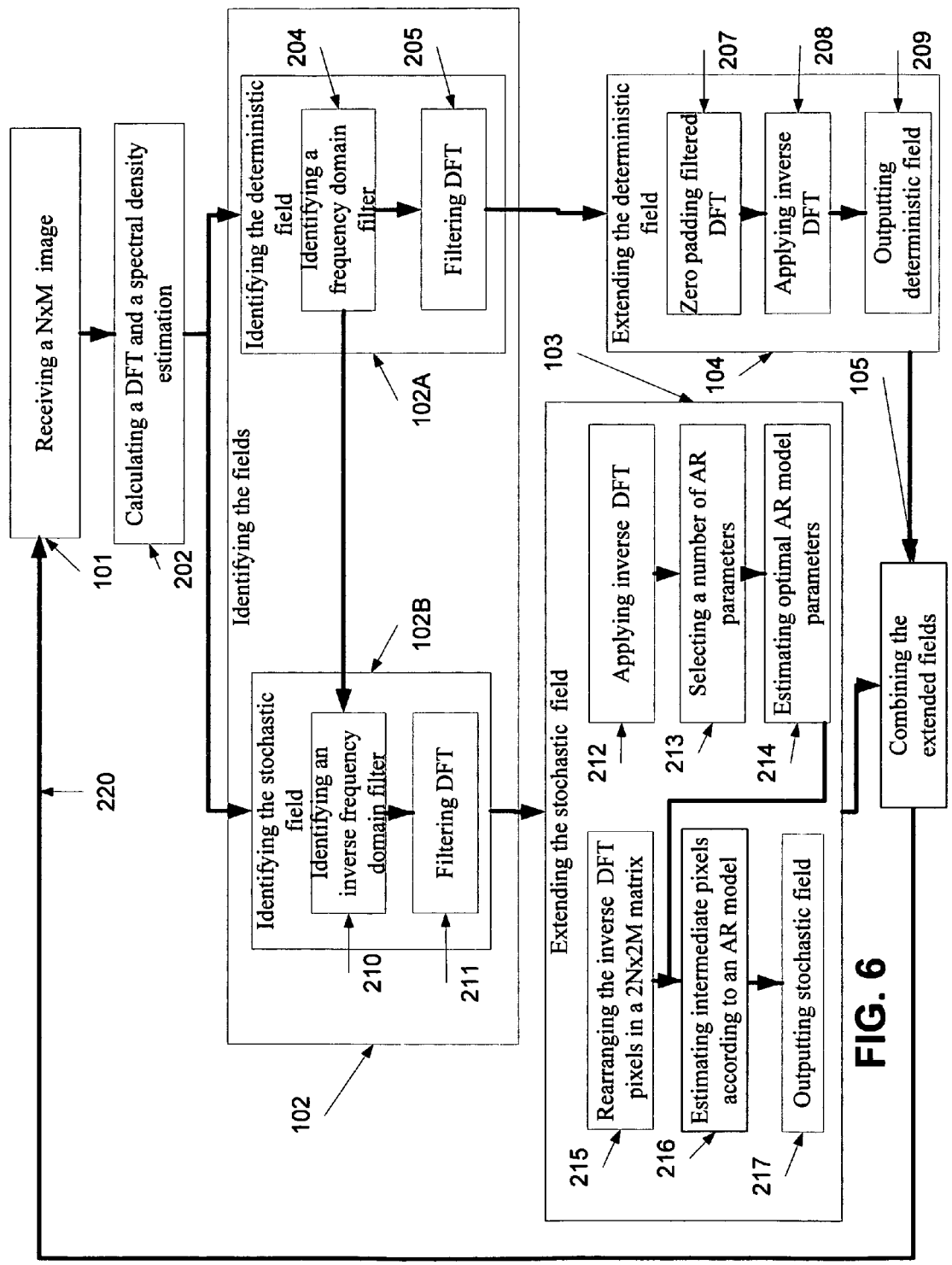
FIG. 6 is a flowchart of a method of assembling an image with an increased spatial resolution by interpolating stochastic and deterministic fields of an original image with lower spatial resolution according to an autoregressive model, according to some embodiments of the present invention.

Reference is now made to FIG. 6, which is a flowchart of a method for interpolating an image of a textural pattern for creating an additional image of the textural pattern with a higher spatial resolution, according to some embodiments of the present invention. Blocks 101-105 are as described in FIG. 1, however the sub blocks pertain to a method that is adapted for increasing the spatial resolution of a textural pattern and based on an interpolation.

First, as shown at 101 and described above, an image of N×M pixels is received.

Optionally, as shown at 202, a discrete Fourier transform (DFT) and a spectral density estimation, such as a periodogram, is calculated for the received image.

Now, as shown at 102A and described above, a harmonic field of the received image is identified and optionally extracted. Optionally, the DFT of the harmonic field, referred to herein as a harmonic DFT, is identified in the DFT of the received image. First, as shown at 204, a frequency domain filter is created. Optionally, the frequency domain filter is created by identifying the peaks of the periodogram, for example by 2-D delta functions, and generating a 2-D mask whose value is 1 at the locations of those peaks and 0 elsewhere. Then, as shown at 205, the frequency domain filter is used for filtering the DFT of the received image, creating the harmonic DFT.

Now, as shown at 104, the spatial resolution of the harmonic DFT is increased to create an increased spatial resolution harmonic field, which may be referred to herein as ĥ. Optionally, as shown at 207, the filtered harmonic DFT is zero padded to correspond to a target spatial resolution. Then, as shown at 208, an inverse of the DFT of the received image is applied on the zero padded filtered harmonic DFT according to the pattern of the zero padding.

As shown at 209, the zero padded filtered harmonic DFT is identified as the harmonic field.

In addition, as shown at 102B, the stochastic field is identified and optionally extracted. Optionally, as shown at 210, an inverse frequency domain filter is created, optionally by calculating a mask that is negative the mask of the aforementioned frequency domain filter. Then, as shown at 211, the inverse frequency domain filter is used for filtering the DFT of the received image, creating the stochastic field, which is purely in-deterministic field of the received image, and may be referred to herein as a stochastic DFT.

Now, as shown at 103, the spatial resolution of the stochastic field is increased.

Optionally, as shown at 212, an inverse of the DFT of received image, such as described, is applied on the stochastic DFT. In such a manner, an estimation of the space domain of the stochastic field in the received image, denoted herein as ŵ*, is obtained.

Then, as shown at 213, a number of autoregressive (AR) model parameters, which may be referred to as an AR order, is selected. The selected number reflects the number of linear equations which are used in the AR model. Optionally, a causal pixel neighborhood of 4×4 is used.

Now, as shown at 214, optimal AR model parameters are estimated by analyzing the received image to determine a white noise with a minimum variance criterion, for example using a least square solution. Optionally, the while noise is a zero-mean white noise, denoted herein as u, with variance denoted herein as $\sigma_u^2$, that is assumed to be uncorrelated with the values of the received image.

Figure 7:
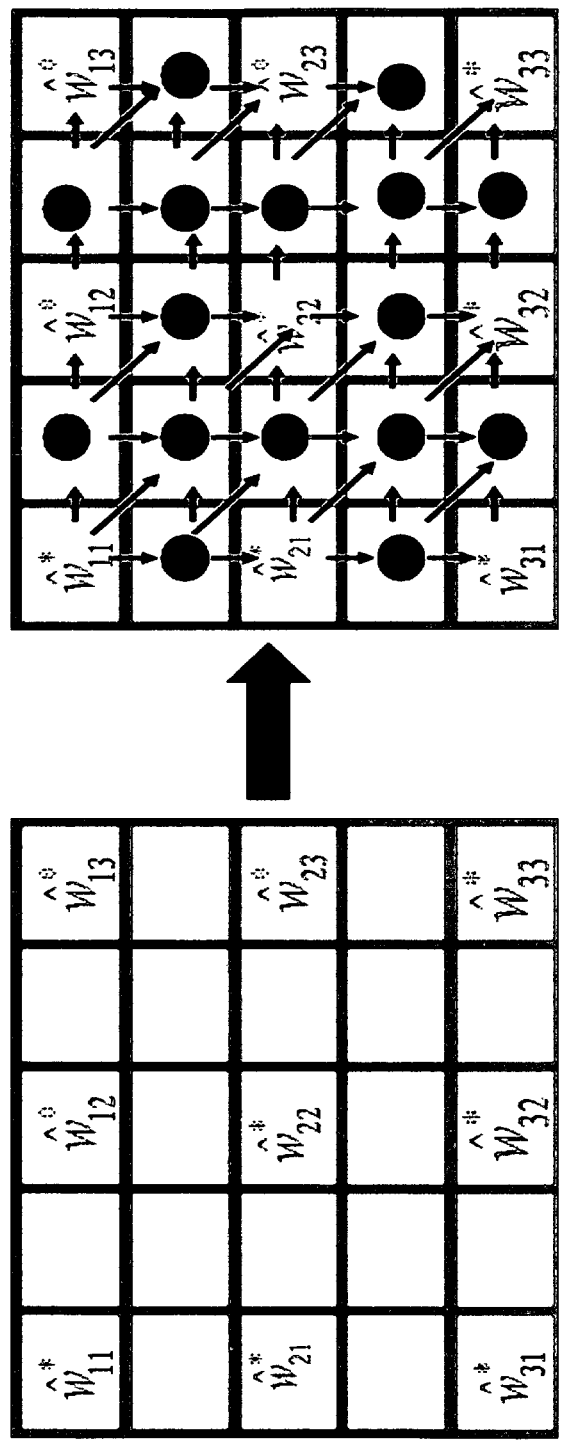
FIG. 7 is a schematic illustration of a 2-D image skeleton of (2N)×(2M) pixels and a pixel population process which is determined according to an autoregressive model, according to some embodiments of the present invention.

Now, as shown at 215, the pixels of the stochastic DFT ŵ* are rearranged in a 2D image skeleton of (2N)×(2M) pixels, such that sampling of this matrix according to the aforementioned sampling operation yields again ŵ*. For example, the pixels may be arranged as depicted in the left panel of FIG. 7.

Now, as shown at 216, the gray levels of pixels at the 2-D image skeleton which have not been populated in 215 are estimated according to an AR module, for example the 2-D AR model that is described at Eq. 3, and optionally using the white noise that was determined in 214. Optionally, the gray levels of pixels of the stochastic DFT are interpolated to provide the gray levels of pixels at the 2-D image skeleton. For example, as shown in the right panel of FIG. 7, the pixels which have not been populated in 215 are denoted by bold dots, and the generation of an image with increased spatial resolution according to the AR module by the white noise process is marked by the black arrows. Pixels whose support neighborhood exceeds the boundaries of the image are initialized as zero-mean white noise samples with a variance that is 0.7-0.8 of the estimated white noise process variance of the stochastic field of the received image. Such white noise samples generate, according to the AR module, the rest of the resolution increased stochastic field, as mentioned above.

Now, as shown at 217, the 2-D image skeleton is outputted as the stochastic field, denoted herein as $\hat{w}$.

Now, as shown at 105, the estimated harmonic and stochastic fields are combined to estimate the image with a spatial resolution of 2N×2M, denoted herein as $\hat{y}$. Optionally, the combination is performed by a simple matrix addition, for example as follows:

$$\hat{y} = \hat{h} + \hat{w}.$$

As shown at 220, this process may be repeated a plurality of times where the image that is outputted after one iteration of 101-105 is used as a received image of the following iteration of 101-105. In such a manner, the method may be used for increasing the spatial resolution of images in any product of $2^n$, where n is a positive integer, for example 2, 4, 8, 16, 32, 64, and 128.

For clarity, an example of an implementation of the method depicted in FIG. 6 is provided as Example A below.

Optionally, the method described in FIG. 1 and/or FIG. 6 may be used for increasing the spatial resolution of one or more segments of an image. In such an embodiment one or more segments that depict a textural pattern are identified in the image. Then, the spatial resolution of each one of the segments is increased using the method described in FIG. 1 and/or FIG. 6. The spatial resolution increased segments may now be used for reconstructing the segmented image in a higher spatial resolution and/or intertwined back into the image as a spatial resolution increased object in the segmented image. In use, a user may mark an object with a textural pattern in an image, for example an image that is presented thereto on a graphical user interface (GUI). The selected object is segmented, using known methods for segmentation and the spatial resolution thereof is increased using the method described in FIG. 1 and/or FIG. 6. The spatial resolution increased object may now be intertwined in the segmented image and/or added to another media object, such as another image or a video file.

Optionally, the method described in FIG. 1 and/or FIG. 6 may be used for compressing and/or decompressing images. In such an embodiment, an image that is compressed to a spatial resolution M×N may be decompressed to a spatial resolution of 2M×2N, 4M×4N, 8M×8N, 16M×16N, and 32M×32N. The decompression may be performed according to the method that is depicted in FIG. 1 and/or FIG. 6.

Optionally, the method depicted in FIG. 1 and/or FIG. 6 is used for decompression a sequence of images, such as a video sequence and/or any other series of images, for example a medical study, such as a computerized tomography (CT) study, an magnetic resonance imaging (MRI) study, and/or a positron emission tomography (PET)-CT. Optionally, each image in the sequence is decompressed according to the method depicted in FIG. 1 and/or FIG. 6.

Optionally, the compression is performed in a similar operation to the aforementioned sampling operation. In such a manner, the AR model parameters which are used for compression are known and used during the interpolation, for example as described above.

Figure 8:
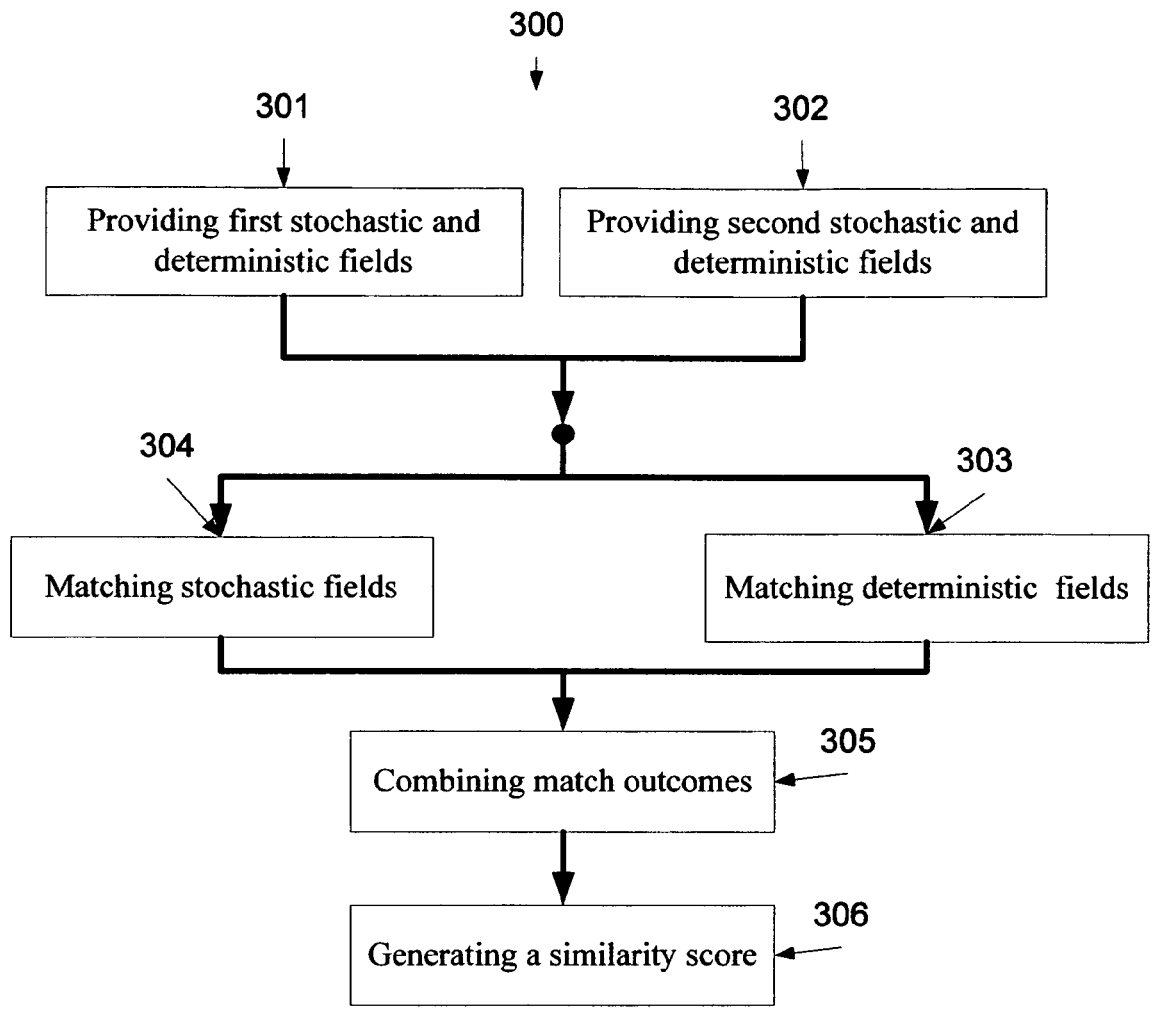
FIG. 8 is a flowchart of a method for estimating a similarity between two or more textural patterns, according to some embodiments of the present invention.

Reference is now made to FIG. 8, which is a flowchart of a method 300 for estimating similarity between two or more textural patterns, according to some embodiments of the present invention.

The method is based on separately matching among the stochastic fields of the two or more textural patterns and among the deterministic fields thereof. The matching results in two components which may be described by a measured distance which consists of the deterministic and the stochastic field distances.

Herein below we describe a matching between two patterns, optionally represented in images; however, this may be used for estimating the similarity among any number of images. For clarity we define the following:

f—a first image depicting a first textural pattern;
$\tilde{f}$—a second image depicting a second textural pattern;
$d_{DET}(f,\tilde{f})$—deterministic field distance; and
$d_{STOCH}(f,\tilde{f})$—stochastic field distance, As shown at 301, first stochastic and deterministic fields of a first textural pattern are provided. As shown at 302, second stochastic and deterministic fields of a second textural pattern are received. Optionally, the stochastic and deterministic fields are identified and decomposed from a received image, for example as described in relation to 102 of FIG. 1.

Now, as shown at 303 a first match between the first and second deterministic fields is performed. The matching allows evaluating the difference, which may be referred to herein as distance, between the deterministic fields. Optionally, the difference is identified as a deterministic field distance, denoted herein as $d_{DET}(f,\tilde{f})$. Optionally, the match is performed by evaluating a fidelity criterion for the reconstruction of monochrome still images, see J. L. Mannos and D. J. Sakrison, "The Effects of Visual Fidelity Criterion on the Encoding of Images", IEEE Transactions on Information Theory, Vol. IT-20, No. 4, July 1974, which is incorporated herein by reference.

Optionally, such a fidelity criterion is calculated according to the following:

(1) Define: $w(x,y)=[u(x,y)].\hat{\ }3$, $\tilde{w}(x,y)=[\tilde{u}(x,y)].\hat{\ }3$,
where $u(x,y)$ and $\tilde{u}(x,y)$ denotes a pair of images and the operator $[\bullet].\hat{\ }3$ stands for point-wise power of 3 of the images.

(2) Calculate a set of Fourier transforms (FFTs):

$$W(f_x,f_y)=FFT\{w(x,y)\}, \tilde{W}(f_x,f_y)=FFT\{\tilde{w}(x,y)\},$$

where $f_x, f_y$ denotes spatial frequencies.

(3) Define the radial frequency: $f_r=\sqrt{(f_x)^2+(f_y)^2}$, and calculate the FFTs in terms of the following frequency:

$$W^R(f_r)=W(f_x,f_y), \tilde{W}^R(f_r)=\tilde{W}(f_x,f_y).$$

(4) For the previously obtained values of the radial frequency, create the following matrix in the frequency domain:

$$A(f_r)=2.6\cdot[0.0192+0.114f_r]\cdot\exp[-(0.114f_r)^{1.1}]$$

$A(f_r)$ should be of the same dimensions as those of $W^R(f_r)$, $\tilde{W}^R(f_r)$.

(5) Calculate:

$$V(f_r)=A(f_r).*W^R(f_r), \tilde{V}(f_r)=A(f_r).*\tilde{W}^R(f_r),$$

where .* stands for point-wise multiplication of the pixels.

(6) Calculate the inverse Fourier transform (denoted as IFFT):

$$v(x,y)=IFFT\{V(f_r)\}, \tilde{v}(x,y)=IFFT\{\tilde{V}(f_r)\}.$$

(7) Define:

$$d(u, \tilde{u}) = \sum_{x,y} [v(x, y) - \tilde{v}(x, y)]^2.$$

where $d(u,\tilde{u})$ denotes the a distortion measure between the images $u,\tilde{u}$ see J. L. Mannos and D. J. Sakrison, "The Effects of Visual Fidelity Criterion on the Encoding of Images", IEEE Transactions on Information Theory, Vol. IT-20, No. 4 July 1974, which is incorporated herein by reference.

$d_{DET}(f,\hat{f})$, which is optionally equal to $d(u,\tilde{e})$, may now be used as an estimation of the similarity between the first and second deterministic fields.

In addition, as shown at 304, a second match between the first and second stochastic fields is performed for evaluating the difference between them, for example as a stochastic components distance. Optionally, the match is performed according to a correlation match property (CMP), see J. M. Francos, A. Z. Meiri and B. Porat, "A Unified Texture Model Based on a 2-D Wold-like Decomposition", IEEE Transactions on Signal Processing, Vol. 41, No. 8, August 1993, which is incorporated herein by reference.

The higher the level of the correlation match property, the higher is the similarity of the 2-D AR model parameters of the compared pair of stochastic fields. In other words, the CMP level implies the equality of a second-order statistics between the purely in-deterministic fields of the images.

The CMP to may be implemented as follows:

An autocorrelation function is calculated on the matched images. This calculation yields two matrices of spatial correlation coefficients. The stochastic field distance $d_{STOCH}(f,\hat{f})$ is then calculated by a point-wise $L_1$ norm on the two matrices, normalized. For example, the stochastic distance may be computed as follows:

$$d_{STOCH}(f, \hat{f}) = \frac{\sum_{i,j}^{I,J} |M_{ij} - \hat{M}_{ij}|}{I \cdot J} \qquad \text{Eq. 31}$$

where $M(I \times J), \hat{M}(I \times J)$ denotes the autocorrelation matrices of the first and second images, respectively. Optionally, the autocorrelation matrices are of dimension 7×7, in order to capture pixel correlations up to a 3×3 pixels distance. Such autocorrelation matrices correspond with a 4×4 pixel neighborhood of the AR model that is described above in relation to FIG. 6.

It should be noted that the second-order statistics represent the textural information of homogeneous purely in-deterministic random textures, see B. Julesz, "A Theory of Preattentive Texture Discrimination Based on First-Order Statistics of Textons", Biological Cybernetics, no. 41, 1981, pp. 131-138, which is incorporated herein by reference.

According to the above, $d_{STOCH}(f,\hat{f})$ is used as an estimation of the similarity between the first and second stochastic fields.

Now, as shown at 305, the $d_{STOCH}(f,\hat{f})$ and $d_{DET}(f,\hat{f})$, which may be respectively considered as the similarity scores of the stochastic and deterministic fields may now be combined. As shown at 306, the combination thereof allows generating a similarity score that evaluates the similarity between the two images.

The method depicted in FIG. 8 may be used for assessing the similarity between textural patterns and/or images. For example, the method may be used for controlling the quality of products which are manufactured in various processes, such as weaving, spinning, dyeing welding, paving, tiling, flagging knotting, knitting, claying, and the like. In such an embodiment, the textural pattern of the product may be captured by an image sensor, such as a complementary metal oxide semiconductor (CMOS) and/or a charge coupled device (CCD) based sensor, during and/or after the manufacturing process, for example on the product line. The captured image may now be matched using the method described in FIG. 8, with an image or a model of a valid product for generating a similarity score. If the similarity score is below a threshold, optionally predefined, than the product is disqualified and removed from the product line. Else, the product is tagged as valid.

Optionally, the method is used for in an image search engine. In such an embodiment, a user may upload and/or select an image that depicts one or more textural pattern as a search query. The method allows identifying similar images that have similar one or more textural patterns. The stochastic and deterministic fields of the textural pattern are identified, for example as described above, and respectively and separately matched with stochastic and deterministic fields of other images. Optionally, each match is performed as depicted in FIG. 8. Optionally, the stochastic and deterministic fields of the uploaded or selected image are matched with preprocessed images. Each preprocessed image is associated with respective stochastic and deterministic fields. In such a manner the stochastic and deterministic fields may be matched with lower computational complexity.

Optionally, if an image, such as the uploaded and/or selected image comprises a plurality of textural patterns, such as a foreground and a background, a number of elements, a number of layers, and the like, it is segmented to a plurality of textural objects. The segmentation is optionally performed by methods which are known in the art and therefore not elaborated further herein. Each one of the textural objects is separately matched with respective textural objects in a matched image. Each match is optionally performed as depicted in FIG. 8. In such a manner, images with non uniform texture may be matched.

Optionally, the method is used for estimating the quality of a resolution increased image which has been generated by increasing the spatial resolution of an original image, for example by image stretching and image skewing, and/or by any other spatial resolution increasing operation, for example as described in FIG. 1 and FIG. 6. In such an embodiment, the first and second images are the original image and the resolution increased image.

Optionally, the method is used for encrypting and decrypting. In such embodiment, each similarity score represents a different value. In such an embodiment, a value that is associated with a predefined similarity score may be encrypted into a product by printing or otherwise associating a textural pattern therewith. The textural pattern is optionally blurred or otherwise amended to generate a blurred textural pattern that corresponds to the predefined similarity score when matched with the textural pattern.

In such an embodiment, the decrypting is performed by matching between the textural pattern and the blurred textural pattern, for example by using the method depicted in FIG. 8, for estimating the similarity score and using the similarity score for learning the value.

Such blurred pattern may be used for tagging and/or marking products, bills, images, and/or printouts with a relatively invisible tag.

Figure 9:
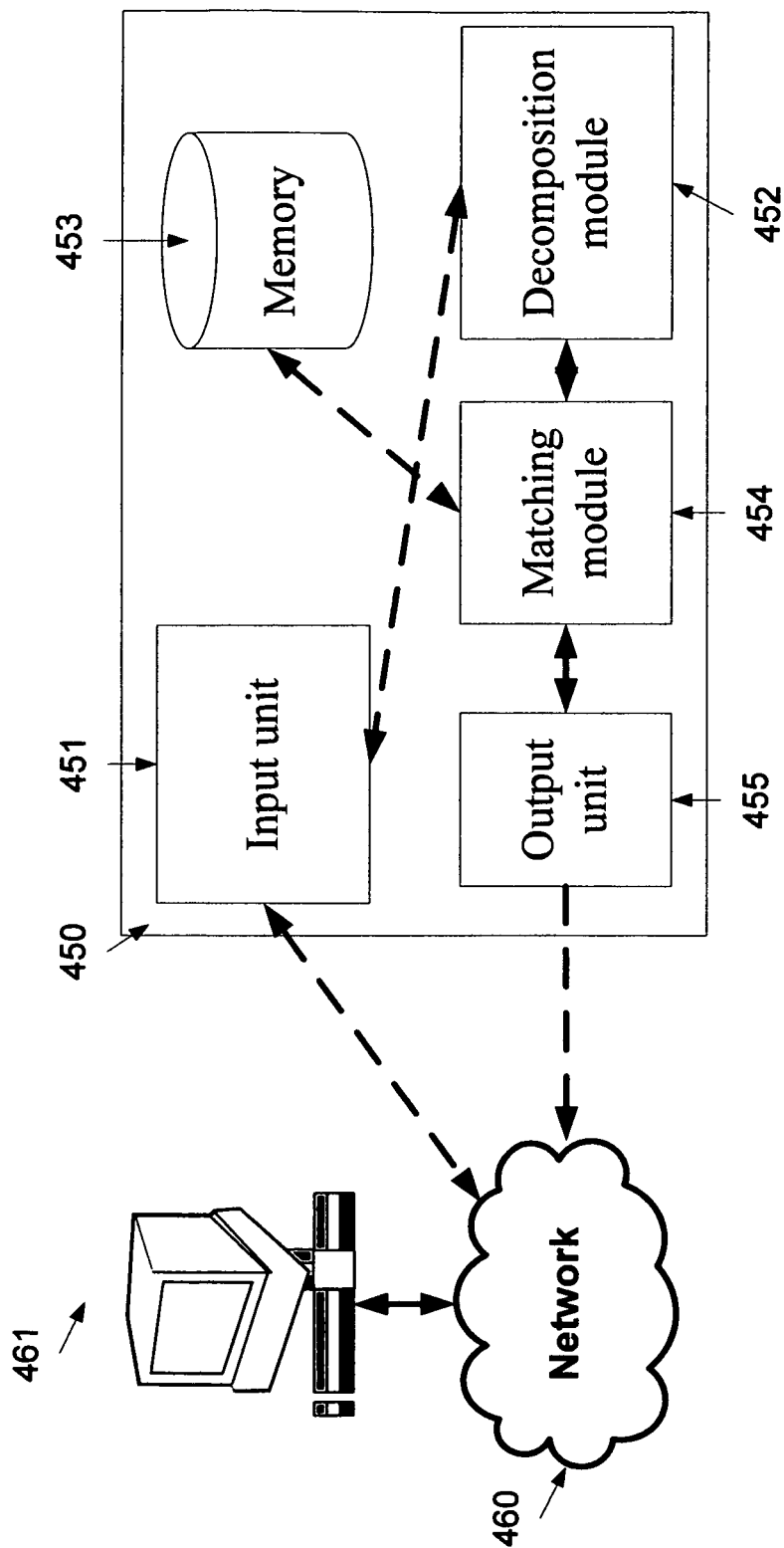
FIG. 9 is a schematic illustration of a system for estimating image similarity, according to some embodiments of the present invention.

Reference is now made to FIG. 9, which is a system 450 for estimating image similarity, according to some embodiments of the present invention. The system 450 comprises an input unit 451 configured for receiving an image depicting a textural pattern. The input unit may be a network interface, allowing the reception of the image from a remote client terminal 461, for example over a network 460, such as the internet The system 450 further comprises a decomposition module 452 for decomposing received stochastic and deterministic fields from the received textural pattern, for example as described above. The system comprises a memory 453 for storing one or more textural patterns having stochastic and deterministic fields. Optionally, the memory is 453 a storage device, such as a storage server. Optionally, the stochastic and deterministic fields of the stored textural pattern are decomposed in advance, allowing the matching thereof without additional decomposition processes. The system further comprises a matching module 454 configured for separately scoring a first match between the received and stored stochastic fields and a second match between the received and stored deterministic fields. The matches are optionally performed as described above. The system further comprises an output module 455 for outputting a similarity score by using the first and second matches. The outputted score may be forwarded and presented to the system operator.

It is expected that during the life of a patent maturing from this application many relevant systems and methods will be developed and the scope of the term image, video file and processing is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

Various embodiments and aspects of the present invention as delineated hereinabove and as claimed in the claims section below find experimental support in the following examples.

Example A

Reference is now made to the following example A, which together with the above descriptions, illustrate some embodiments of the invention in a non limiting fashion.

The following set of 220 Matlab code lines is an exemplary implementation of the method described in FIG. 6 with an exemplary image.

```
% Loading and arranging the texture image
orig_img=imread ('1.2.09','tiff'); % WOOD GRAIN texture;
orig_img=orig_img(1:500,1:500,:);orig_img=double (orig_img);
orig_img=orig_img-mean(mean(orig_img)); % centering around zero figure; colormap('gray'); imagesc(orig_img); title('Original texture');
% SAMPLING+CENTERING AROUND ZERO
in_img=orig_img(1:2:end, 1:2:end);% sampling-to obtain the input image figure; colormap('gray'); imagesc(in_img); title(-Input (downsampled) texture');
```

```
% INTERP TEXTURE
maxima=0.25*2*10^5; % threshold value for detection of
2-D delta functions out_img=INTERP_TEXTURE (in_img,
maxima);
figure; colormap('gray'); imagesc(out_img);title('Output
(interpolated) texture');
N=7; p=100;d_fidelity=d_text (orig_img,out_img, maxima,
N, p); % novel fidelity criterion for texture reconstruction
function out_img=INTERP_TEXTURE (in_img, maxima);
% This function receives a texture image as an input and
interpolates it.
% Input: in_img-texture input
% maxima-threshold for detecting 2-D delta functions.
% Output: out_img-high spatial resolution, interpolated tex-
ture.
in_img=in_img-mean(mean(in_img)); % centering around
zero
max_in_img=max(max(in_img)); % reserving max and min
values of the input image
min_in_img=min(min(in_img));
% extracting the harmonic component
dft_in_img=fftshift(fft2(in_img));
est_low_det_comp=extract_det_comp(in_img, maxima);
% Interpolating the deterministic component
abs_dft_in_img=abs(dft_in_img);
[ind1_vec,ind2_vec]=find (abs_dft_in_img>maxima);
[nrow ncol]=size(in_img);
mask_low=ones(size(in_img));% mask for filtering in the
frequency domain. the mask is in the LOW spatial resolution
mask_high=ones(2*size(in_img)); % mask for filtering in the
frequency domain, the mask is in the HIGH spatial resolution.
est_dft_det_comp=zeros(2*size(in_img));% initialization of
estimated spectrum of harmonic component, in the HIGH
spatial resolution
% filtering out the harmonic component
for k=1:length(ind1_vec),
ind1=ind1_vec(k);ind2=ind2_vec(k);
mask_low(ind1,ind2)=0;temp=dft_in_img(ind1,ind2);
ind1=ind1-nrow/2+nrow;ind2 ind2-ncol/2+ncol;
mask_high(ind1,ind2)=0;est_dft_det_comp(ind1,ind2)=
temp;
end;
est_high_det_comp=4*real(ifft2(ifftshift(est_dft_det_
comp))); % the 4 factor stems from the zero padding in the
frequency domain
est_high_det_comp=est_high_det_comp-mean(mean(est_
high_det_comp)); % centering around zero
% extracting the purely in-deterministic component
est_dft_markov_comp=dft_in_img.*mask_low;
est_markov_comp=real(ifft2(ifftshift(est_dft_markov_
comp))); % extracting the indeterministic component in the
low spatial resolution
est_markov_comp=est_markov_comp-mean(mean(est_
markov_comp)); % centering around zero
% LEAST SQUARES ESTIMATION SOLUTION-FOR
THE LOW SPATIAL RESOLUTION IMAGE
num_rows=100; % numbers of scanned rows and columns
num_cols=100;p_rows=4;p_cols=4;
T=[ ]; % pixels' valued matrix
s=zeros(num_rows*num_cols,1); % pixels' valued vector
ind_s=1;
for ii=(p_rows+1):(p_rows+1+num_rows-1),
for jj=(p_cols+1):(p_cols+1+num_cols-1),
s(ind_s)=est_markov_comp(ii,jj); % update s vector
ind_s=ind_s+1;
T_new=est_markov_comp((ii-p_rows+1):ii,(jj-p_cols+1):
jj);
T_new=(T_new(:))'; T_new=T_new(1:end-1); % we omit
the last pixel, which obviously can't participate in its own
estimation!
T=[T; T_new];
end;end;
a_opt_low=(inv(T'*T))*T'*s; % optimal AR coefficients-for
the low spatial resolution image
% estimating the innovation process variance-for the low
spatial resolution image
est_var_low=(1/(ind_s-1))*(T*a_opt_low-s)'*
(T*a_opt_low-s);
est_std_low=sqrt(est_var_low);
max_markov_comp=max(max(est_markov_comp));
min_markov_comp=min(min(est_markov_comp));
% Interpolating the in-deterministic component
texture=kron(est_markov_comp,[1 0; 0 0]);
est_std_mark=0.8*est_std_low;
[nrow,ncol]=size(texture);
for ii=1:nrow,
for jj=1:p_cols,
if (texture(ii,jj)==0),texture(ii,jj)=est_std_mark*randn(1);
end;end;end;
for ii=1:p_rows,
for jj=1:ncol,
if (texture(ii,jj)==0),texture(ii,jj)=est_std_mark*randn(1);
end;end;end;
for ii=(p_rows):nrow,
for jj=(p_cols):ncol,
if (texture(ii,jj)==0),
texture_sb=texture((ii-p_rows+1):ii,(jj-p_cols+1):jj);
texture_sb=(texture_sb(:))'; texture_sb=texture_sb(1:end-
1);
texture(ii,jj)=texture_sb*a_opt_low_est_std_mark*randn
(1); % taking the variance of the innovation process of the
sampled version
end;end;end;
texture=stretch_hist (texture, min_markov_comp, max_
markov_comp);
out_img=texture+est_high_det_comp;
out_img=remove_outliers(out_img, min_in_img, max_in_
img);
function out_img=remove_outliers (in_img, clow, chigh);
% This function removes outliers from the image IN_IMG.
% CLOW and CHIGH are the edges for the outliers removal.
[big_row, big_col]=find(in_img>chigh);
[small_row, small_col]=find(in_img<clow);
for k 1:length(big_row),
ind1=big_row(k);ind2=big_col(k);in_img(ind1,ind2)=
chigh;
end;
for k=1:length(small_row),
ind1=small_row(k);ind2=small_col(k);in_img(ind1,ind2)=
clow;
end;
out_img in_img;
function out_img=stretch_hist (in_img, clow, chigh);
% This function performs hist stretch of the input image
IN_IMG to the range [clow, chigh].
min_in_img=min(min(in_img));max_in_img=max(max
(in_img));
out_img=((in_img-min_in_img)/(max_in_img-min_in_
img))*(chigh-clow)+clow;
function d=d_text (texture1,texture2, maxima, N, p);
% This function receives two image textures (texture1,tex-
ture2) as an
```

```
% input, and returns their distance according to the proposed
fidelity
% criterion for texture inteprolation N-size of auto correla-
tionmatrix.
% maxima-threshold for 2-D delta function detection.
% p-size of patch on which the autocorrelation calculation is
applied.
det_comp1=extract_det_comp(texture1,maxima);
det_comp2=extract_det_comp(texture2,maxima);
in_det_comp1=texture1-det_comp1;
in_det_comp2=texture2-det_comp2;
d_det=Mannos_and_Sak(det_comp1,det_comp2);
[nrow,ncol]=size(texture1);d_det=d_det/(nrow*ncol);
Rff_1=calc_Rff_mat(in_det_comp1,N,p);
Rff_2=calc_Rff_mat(in_det_comp2,N,p);
d_in_det=sum(sum(abs(Rff_1-Rff_2)))/N^2;
d=[d_det, d_in_det];
function det_comp=extract_det_comp(texture,maxima);
% This function receives a texture TEXTURE as an input and
extracts its deterministic component according to the param-
eter threshold MAXIMA.
dft_texture=fftshift(fft2(texture));
abs_dft_texture=abs(dft_texture);
[ind1_vec,ind2vec]=find (abs_dft_texture>maxima);
[nrow,ncol]=size(texture);
est_dft_det_comp=zeros(size(texture));% initialization of
estimated spectrum of harmonic component
% filtering out the harmonic component
for k=1:length(ind1_vec),
ind1=ind1_vec(k);ind2=ind2_vec(k);
temp=dft_texture(ind1,ind2);
est_dft_det_comp(ind1,ind2)=temp;
end;
det_comp=real(ifft2(ifftshift(est_dft_det_comp)));
function Rff_mat=calc_Rff_mat(img,N,p);
% This function calculates the autocorrelation matrix for a
given image
% IMG. The output autocorrelation function is of dimension
N×N.
% The calculation is held on a patch of size p×p from the
image.
% N should be odd!
Rff_mat=zeros(N,N);
img=img(1:p,1:p);
img=img-mean(mean(img)); % centering around zero
for ii=1:N,
for jj=1:N,
alpha=-(N+1)/2+ii;beta=-(N+1)/2+jj;
Rff_mat(ii,jj)=Rff_hat(img,alpha,beta);
end;end;
Rff_mat=Rff_mat/max(max(Rff_mat));
function r_hat=Rff_hat (f; alpha, beta);
% This function receives as an input an image f, and returns its
estimated
% UNBIASED auto-covariance at (alpha,beta).
[M, N]=size(f);acum=0;
if sign(alpha*beta)>=0,
for m=1:(M-abs(alpha)),
for n=1:(N-abs(beta)),
acum=acum+f(m,n)*f(m+abs(alpha), n+abs(beta));
end;end;
else
if beta<0, % one of the parameters is positive and the other is
negative
for m=1:(M-abs(alpha)),
for n=(abs(beta)+1):N,
acum=acum+f(m,n)*f(m+abs(alpha), n-abs(beta));
end;end;
else
for m=(abs(alpha)+1):M,
for n=1:(N-abs(beta)),
acum=acum+f(m,n)*f(m-abs(alpha), n+abs(beta));
end;end;end;end;
r_hat=acum/((M-abs(alpha))*(N-abs(beta)));
function d=Mannos_and_Sak (img1, img2);
% This function receives as an input two black and white
images img1,img2 and returns their
% relative distortion according to the Mannos and Sakrison
criterion for
% Black and White images.
% It is assumed that img1,img2 are of the same dimension
and of class
% double.
img1=double(img1);img2=double(img2);
if min(min(img1))<0,
img1=img1+abs(min(min(img1)));
end;
if min(min(img2))<0,
   img2=img2+abs(min(min(img2)));
end;
img1=img1/max(max(img1));% normalization of images
img2=img2/max(max(img2));
w1=img1.^3;% operation of function f(u)=^3
w2=img2.^3;
[N,M]=size(img1);
W1=fftshift(fft2(w1));% moving to the spatial frequency
domain.
W2=fftshift(fft2(w2)); % fftshift is applied due to isotropy
assumption.
f_x_vec=0.168*[-(M-1)/2:(M-1)/2];% frequency vectors in
cpd. (see Mannos and Sakrison paper, page 529 for refer-
ence).
f_y_vec=0.168*[-(N-1)/2:(N-1)/2];% frequencies are cen-
tered in accordance with fftshift
[f_x_mat, f_y_mat]=meshgrid(f_x_vec,f_y_vec);% fre-
quency matrices
f_r=sqrt(f_x_mat.^2+f_y_mat.^2);% central frequency (ac-
cording to the isotropy assumption)
A_f_r=2.6*(0.0192 +0.114*f_r).*exp(-(0.114*f_r).^1.1);%
fft of LSI (linear operator)
V1=A_f_r.*W1;V2=A_f_r.*W2;
v1=ifft2(ifftshift(V1));v2=ifft2(ifftshift(V2));
d=sum(sum((abs(v1-v2)).^2)); % the distortion measure is
obtained as the normalized MSE in raster scan
```

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of increasing a resolution of a pattern, comprising:
receiving an image depicting a pattern;
identifying a stochastic field and a deterministic field of said pattern;
separately increasing resolution of said stochastic field using a first resolution increasing operation;
separately increasing resolution of said deterministic field using a second resolution increasing function; and
assembling said resolution increased stochastic and deterministic fields to create an additional image of said pattern;
wherein said pattern in said additional image having a higher spatial resolution than in said image;
wherein said first and second resolution increasing functions are different resolution increasing functions.

2. The method of claim 1, wherein said separately increasing resolution of said stochastic field comprising interpolating said stochastic field according to an autoregressive (AR) model.

3. The method of claim 2, wherein said separately increasing resolution of said stochastic field comprising detecting an invariance of a gray level distribution in said stochastic field, said AR model being based on said invariance.

4. The method of claim 2, wherein said identifying estimating a plurality of AR model parameters for reducing error variance and said interpolating comprising using said AR model parameters.

5. The method of claim 2, wherein said autoregressive model is a wide-sense Markov field model.

6. The method of claim 1, wherein said separately increasing resolution of said stochastic field comprising estimating a white noise distribution in said pattern and interpolating said stochastic field according to said white noise distribution.

7. The method of claim 1, wherein said separately increasing resolution of said deterministic field comprising zero padding said deterministic field according to an autoregressive (AR) model.

8. The method of claim 1, wherein said separately increasing resolution of said deterministic field comprising detecting periodic features in said pattern and increasing the resolution of said deterministic field accordingly.

9. The method of claim 1, wherein said pattern is a textural pattern.

10. The method of claim 1, wherein said receiving further comprises segmenting said pattern from said image.

11. The method of claim 10, wherein said image comprises a plurality of patterns, further comprising performing said receiving, said identifying, said separately increasing resolution of said stochastic field, said separately increasing resolution of said deterministic field and said assembling in a plurality of iterations, each said pattern being segmented and separately processed according to a respective outcome of each said iteration.

12. A computer program product, comprising a non-transitory computer usable medium having a computer readable program code stored therein, said computer readable program code adapted to be executed to implement a method for method of increasing a resolution of a pattern, comprising:
receiving an image depicting a pattern;
identifying a stochastic field and a deterministic field of said pattern;
separately increasing resolution of said stochastic field according to a first resolution increasing function;
separately increasing resolution of each said deterministic field according to a second resolution increasing function; and
assembling said resolution increased stochastic and deterministic fields to create an additional image of said pattern;
wherein said pattern in said additional image having a higher spatial resolution than in said image;
wherein said first resolution increasing function and said second resolution increasing function are different resolution increasing functions.

* * * * *